US012027146B2

(12) United States Patent
Nordin et al.

(10) Patent No.: US 12,027,146 B2
(45) Date of Patent: Jul. 2, 2024

(54) INSTRUMENT AND METHOD FOR REAL-TIME MUSIC GENERATION

(71) Applicant: REACTIONAL MUSIC GROUP AB, Stockholm (SE)

(72) Inventors: Jesper Nordin, Hägersten (SE); Jonatan Liljedahl, Hamburgsund (SE); Jonas Kjellberg, Västra Frölunda (SE); Pär Gunnars Risberg, Stockholm (SE)

(73) Assignee: REACTIONAL MUSIC GROUP AB, Stockholm (SE)

( * ) Notice: Subject to any disclaimer, the term of this patent is extended or adjusted under 35 U.S.C. 154(b) by 523 days.

(21) Appl. No.: 17/277,817

(22) PCT Filed: Sep. 24, 2019

(86) PCT No.: PCT/SE2019/050909
§ 371 (c)(1),
(2) Date: Mar. 19, 2021

(87) PCT Pub. No.: WO2020/067972
PCT Pub. Date: Apr. 2, 2020

(65) Prior Publication Data

US 2022/0114993 A1 Apr. 14, 2022

(30) Foreign Application Priority Data

Sep. 25, 2018 (SE) .................................... 1851144-4

(51) Int. Cl.
*G10H 1/00* (2006.01)
*G10H 1/26* (2006.01)

(52) U.S. Cl.
CPC ............. *G10H 1/0025* (2013.01); *G10H 1/26* (2013.01); *G10H 1/0066* (2013.01);
(Continued)

(58) Field of Classification Search
CPC ...... G10H 1/0025; G10H 1/26; G10H 1/0066; G10H 2210/026; G10H 2210/111;
(Continued)

(56) References Cited

U.S. PATENT DOCUMENTS 6,898,759 B1 * 5/2005 Terada .................. G10H 1/368 345/473
7,169,996 B2 * 1/2007 Georges .................. G06F 3/165 84/609
(Continued)

FOREIGN PATENT DOCUMENTS

EP 1994525 B1 * 10/2016 ........... G10H 1/0025
WO WO 96/24422 A1 8/1996
(Continued)

OTHER PUBLICATIONS

Internaitonal Search Report, issued in PCT/SE2019/050909, dated Nov. 13, 2019.
(Continued)

*Primary Examiner* — Christina M Schreiber
(74) *Attorney, Agent, or Firm* — Birch, Stewart, Kolasch & Birch, LLP

(57) ABSTRACT

A virtual instrument for real-time musical generation includes a musical rule set unit for defining musical rules, a time constrained pitch generator for synchronizing generated music, an audio generator for generating audio signals, wherein the rule definitions describe real-time morphable music parameters, and said morphable music parameters are controllable directly by the real-time control signal. With this virtual instrument, the user can create new musical content in a simple and interactive way regardless of the level of musical training obtained before using the instrument.

15 Claims, 5 Drawing Sheets

(52) U.S. Cl.
CPC .. *G10H 2210/026* (2013.01); *G10H 2210/111* (2013.01); *G10H 2210/145* (2013.01); *G10H 2220/161* (2013.01); *G10H 2240/056* (2013.01); *G10H 2240/175* (2013.01)

(58) Field of Classification Search
CPC ....... G10H 2210/145; G10H 2220/161; G10H 2240/056; G10H 2240/175
USPC .......................................................... 84/609
See application file for complete search history.

(56) References Cited

U.S. PATENT DOCUMENTS

| | | | | |
|---|---|---|---|---|
| 8,330,033 | B2 * | 12/2012 | Lengeling | G10H 1/0025 84/645 |
| 9,542,919 | B1 * | 1/2017 | Bencar | G10H 1/0066 |
| 11,651,757 | B2 * | 5/2023 | Silverstein | G06N 20/00 84/600 |
| 2003/0037664 | A1 * | 2/2003 | Comair | G10H 1/0025 84/609 |
| 2007/0221044 | A1 * | 9/2007 | Orr | G10H 1/0025 84/609 |
| 2008/0066609 | A1 * | 3/2008 | Bourgeois | G10H 1/0025 84/609 |
| 2008/0156178 | A1 * | 7/2008 | Georges | G10H 1/365 84/645 |
| 2009/0114079 | A1 * | 5/2009 | Egan | G09B 15/023 84/477 R |
| 2010/0307320 | A1 * | 12/2010 | Hoeberechts | G10H 1/0025 84/600 |
| 2011/0010321 | A1 * | 1/2011 | Pachet | G06N 20/00 706/12 |
| 2013/0305908 | A1 * | 11/2013 | Iwase | G10H 1/40 84/624 |
| 2014/0000440 | A1 * | 1/2014 | Georges | G10H 7/00 84/609 |
| 2016/0063975 | A1 * | 3/2016 | Chu | G10H 1/0033 84/645 |
| 2016/0210947 | A1 * | 7/2016 | Rutledge | G10G 1/04 |
| 2017/0092247 | A1 * | 3/2017 | Silverstein | G10H 1/368 |
| 2017/0186411 | A1 * | 6/2017 | Mintz | A63F 9/24 |
| 2017/0263226 | A1 * | 9/2017 | Silverstein | G10H 1/0025 |
| 2017/0263227 | A1 * | 9/2017 | Silverstein | G10L 25/15 |
| 2017/0358285 | A1 * | 12/2017 | Cabral | G06N 5/04 |
| 2019/0237051 | A1 * | 8/2019 | Silverstein | G06N 7/01 |
| 2020/0168188 | A1 * | 5/2020 | Silverstein | G06N 20/00 |
| 2021/0350777 | A1 * | 11/2021 | Nordin | G10H 1/0025 |
| 2022/0114993 | A1 * | 4/2022 | Nordin | G10H 1/0033 |
| 2022/0262328 | A1 * | 8/2022 | Lerman | G10H 1/368 |
| 2023/0114371 | A1 * | 4/2023 | Lopez Duarte | A63F 13/60 463/35 |

FOREIGN PATENT DOCUMENTS

| | | | | |
|---|---|---|---|---|
| WO | WO-9624422 A1 * | 8/1996 | | G10H 1/0025 |
| WO | WO-0186625 A2 * | 11/2001 | | G10H 1/0025 |
| WO | WO-2007106371 A2 * | 9/2007 | | G10H 1/0025 |

OTHER PUBLICATIONS

Written Opinion of the International Searching Authority, issued in PCT/SE2019/050909, dated Nov. 13, 2019.

Aspromallis et al., "Form-Aware, Real-Time Adaptive Music Generation for Interactive Experiences," University College London, 2016, 8 pages total.

Brown et al., "The Morph Table: A collaborative interface for musical interaction," Proceedings of the Australasian Computer Music Conference, 2007, pp. 34-39.

Extended European Search Report for European Application No. 19866655.4, dated Jun. 1, 2022.

Morreale et al., "Robin: An Algorithmic Composer for Interactive Scenarios," University of Trento, 2013, 6 pages total.

Wallis et al., "A Rule-Based Generative Music System Controlled by Desired Valence and Arousal," School of Arts, Media, and Engineering, 2011, 8 pages total.

Wallis et al., "Computer-Generating Emotional Music: The Design of an Affective Music Algorithm," Proc. of the 11th Int. Conference on Digital Audio Effects (DAFx-08), Espoo, Finland, Sep. 1-4, 2008, pp. 1-6.

Wooller, "Techniques for automated and interactive note sequence morphing of mainstream electronic music," Music and Sound Discipline, Creative Industries Faculty, Queensland University of Technology, 2007, 355 pages total.

* cited by examiner

INSTRUMENT AND METHOD FOR REAL-TIME MUSIC GENERATION

BACKGROUND

Technical Field

The present disclosure is directed to music generation in consumer products as well as professional music equipment and software. More particularly, the invention relates to virtual instruments and methods for real-time music generation.

Background

Music, just like most other industries, is getting more and more digital both when it comes to creation and reproduction. This opens doors to new experiences where the lines between creation and reproduction can be blurred by varying levels of end-user interaction. Very few have the opportunity and ability to truly master a traditional musical instrument, but the interest in music is widely spread both when it comes to consumption through listening and interaction through dancing, karaoke, musical games etc.

State-of-the-Art

The current state of the art regarding interactive music experiences is mostly seen in games, where the user is supposed to hit pre-defined cues in different ways, using input such as simplified musical instruments, dancing mats, gestures, vocal pitch etc. The limitation throughout these first-generation interactive music experiences is that none of them involve actual music creation since the score in the game is based on how accurately a player can hit the cues in a pre-defined sequence of the music. On the other side of the spectra there are musical tools that actually let the user create music, such as a wide range of synthesizers, sequencers, vocal auto-tuners etc. to help musicians in their creation process. These tools however, require the user to be a trained musician in order to understand how to use them properly. This means that there is always a trade-off between simplicity and ability to actually create new musical content interactively.

SUMMARY

One objective of the present disclosure is to provide a virtual instrument and method for enabling truly interactive music experiences while maintaining a very low threshold in terms of musical training of the end user.

Another objective is to provide a computer program product comprising instructions for enabling truly interactive music experiences while maintaining a very low threshold in terms of musical training of the end user.

The above objectives are wholly or partially met by devices, systems, and methods according to the appended claims in accordance with the present disclosure. Features and aspects are set forth in the appended claims, in the following description, and in the annexed drawings in accordance with the present disclosure.

According to a first aspect, there is provided a virtual instrument for real-time music generation. The virtual instrument comprises a Musical Rule Set, MRS, unit, a Timing Constrained Pitch Generator, TCPG, and an audio generator. The MRS unit comprises a predefined composer input, said MRS unit selects a set of instrument properties and at least one set of adaptable rule definitions based on the predefined composer input and combines the selected rule definition with a real-time control signal into note trigger signals associated with time and frequency domain properties, wherein at least one set of adaptable rule definitions describe real-time morphable music parameters, wherein said morphable music parameters are controllable directly by the real-time control signal. The TCPG generates an output signal representing the music; said TCPG synchronizes the new generated pitches in the time and frequency domains based on the note trigger signals. The audio generator may be configured to convert the output signal from the TCPG and combine it with the selected instrument properties into an audio signal.

In an exemplary embodiment the virtual instrument further comprises a musical transition handler configured to interpret the real-time control signal and handle transitions between different sections in the generated music based on musical characteristics according to the predefined composer input, such that the transitions are musically coherent with the adaptable rule definitions currently being morphed.

In another exemplary embodiment of the virtual instrument, the real-time control signal is received from a real-time input device, RID, which is configured to receive input from a touch screen, such as X and Y coordinates of a touched position and translate said input into a control signal. In yet another embodiment the touch screen is configured to provide additional information regarding pressure related to the touch force being received by the touch screen at the touched position and use such additional information together with the X and Y coordinates for each point and translate this input signal into a control signal.

In another exemplary embodiment of the virtual instrument, the real-time control signal is received from a RID, which is configured to receive input from at least one of a spatial camera, a video game parameter and a digital camera and translate said input into a control signal. In yet another embodiment the real-time control signal may be received from a remote musician network.

According to a second aspect, there is provided a method for generating real-time music in a virtual instrument comprising a MRS unit, a TCPG and an audio generator. The method comprises the steps of retrieving a predefined composer input in the MRS unit; storing a plurality of adaptable rule definitions in a memory of the MRS unit, wherein the plurality of adaptable rule definitions describe real-time morphable music parameters and said morphable music parameters are controllable directly by the real-time control signal; receiving a real-time control signal in the MRS unit; selecting a set of adaptable rule definitions; selecting a set of instrument properties; combining the selected adaptable rule definitions with the real-time control signal into note trigger signals associated with time and frequency domain properties; synchronizing, in the TCPG, new generated pitches in time and frequency domains based on the note trigger signals and combining the output signal with the selected set of instrument properties into an audio signal in the audio generator.

In an exemplary embodiment the method further comprises a step of interpreting the real-time control signal and handling transitions between different sections in the generated music based on musical characteristics according to the predefined composer input, such that the transitions are musically coherent with the adaptable rule definitions currently being morphed.

Furthermore, in another embodiment the real-time control signal is received from a real-time input device, RID, which is configured to receive input from a touch screen, such as X and Y coordinates of a touched position and translate said input into a control signal. I yet another embodiment the touch screen is configured to provide additional information regarding pressure related to the touch force being received by the touch screen at the touched position and use such additional information together with the X and Y coordinates for each point and translate this input signal into a control signal.

In a further embodiment the real-time control signal is received from a RID, which is configured to receive input from at least one of a spatial camera, a video game parameter and a digital camera and translate said input into a control signal. The real-time control signal, may according to yet another embodiment, be received from a remote musician network.

According to a third aspect, there is provided a computer program product comprising computer-readable instructions which, when executed on a computer, causes a method according to the above to be performed.

Thus, with the present invention it is possible to interpret user actions interpreted through a structure of musical rules, pitch and rhythm generators. Depending on the strictness and structure of said rules, the present disclosure can act anywhere between a fully playable musical instrument and a fully pre-composed piece of music.

BRIEF DESCRIPTION OF THE DRAWINGS

The invention is now described, by way of example, with reference to the accompanying drawings, in which.

DETAILED DESCRIPTION

Figure 1:
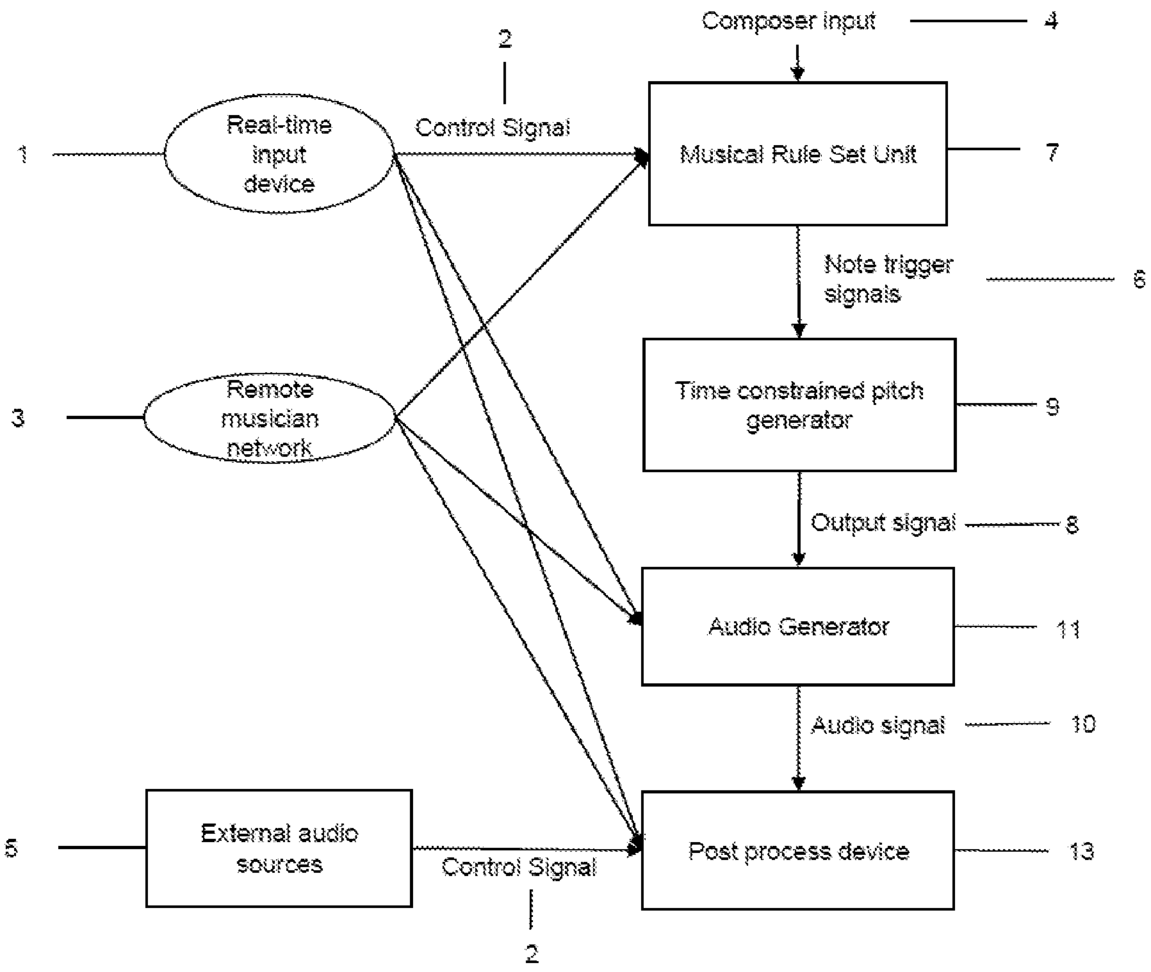
FIG. 1 is an overview of a system in accordance with the present disclosure.

Particular embodiments of the present disclosure are described herein-below with reference to the accompanying drawings; however, the disclosed embodiments are merely examples of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. Like reference numerals may refer to similar or identical elements throughout the description of the figures.

FIG. 1 shows a system overview representing one embodiment of the present disclosure. By real-time input device (RID) 1 is meant a device to be used by the intended musician providing input aimed at directly controlling the music currently being generated by the system. As is commonly known by those skilled in the art, term real-time is a relative term referencing something responding very quickly within a system. In a digital system there is no such thing as instant, since there is always a latency through gates, flip-flops, sub-system clocking, firmware and software. For the avoidance of doubt, the term real-time within the scope of this disclosure is describing events that appear instantly or very quickly when compared to musical time-scales such as bars or sub bars. Such real-time input devices (RID) could be, but are not limited to, one or more touch-screens, gesture sensors such as cameras or laser based sensors, gyroscopes, and other motion tracking systems, eye-tracking devices, vocal input systems such as pitch detectors, auto-tuners and the like, dedicated hardware mimicking musical instruments or forming new kinds of musical instruments, virtual parameters such as parameters in a video game, network commands, artificial intelligence input and the like. The RID-block may be configured to run asynchronous with other blocks in the system and the control signal 2 generated by the RID block may thereby be asynchronous with the musical time-scale. By musician is meant anyone or anything affecting the music being generated by the disclosed system in real-time by manipulating the input to the RID 1.

In one embodiment the control signal 2 corresponds to a cursor status received from the RID 1 in the form of a musician using a touch screen. Said cursor status could contain information about position on a screen as X and Y coordinates and a Z coordinate could be corresponding to the amount of pressure applied on the screen. These control signal values (X, Y, Z) can be transmitted to the musical rule set (MRS) and re-transmitted whenever updated. When the control signal 2 is updated, the MRS can synchronize the timing of said control signal according to the system timing and the pre-defined musical rules. One way of mapping said control signal 2 to musical rules within the MRS is to let X control the rhythmical intensity, such as but not limited to, pulse density and let Y control the tonal pitch, such as but not limited to, pitches or chords and let Z control the velocity of that pitch, chord or the like. Said velocity could, but is not limited to, control the attack, loudness, envelope, sustain, audio sample selection, effect or the like of the corresponding virtual instrument being played by an audio generator 11.

In another embodiment the RID 1 may consist of a motion sensor, such as but not limited to a Microsoft Kinect gaming controller, a virtual reality or augmented reality interface, a gyroscopic motion sensor, a camera based motion sensor, a facial recognition device, a 3D-camera, range camera, stereo camera, laser scanner, beacon based spatial tracking such as the Lighthouse technology from Valve or other means of providing a spatial reading of the musician and optionally also the environment surrounding the musician. One or more resulting 3-dimensional position indicators may be used as a control signal 2 and may be interpreted as X, Y and Z coordinates according to the above description when mapped to musical parameters by the MRS 7.

Such spatial tracking may also be established by less complex 2-dimensional input devices, such as but not limited to digital cameras, by means of computer vision through methods such as centroid tracking of pixel clusters, Haar cascade image analysis, neural networks trained on visual input, or similar approaches and thereby generate one or more cursor positions to be used as control signal 2.

Figure 2A:
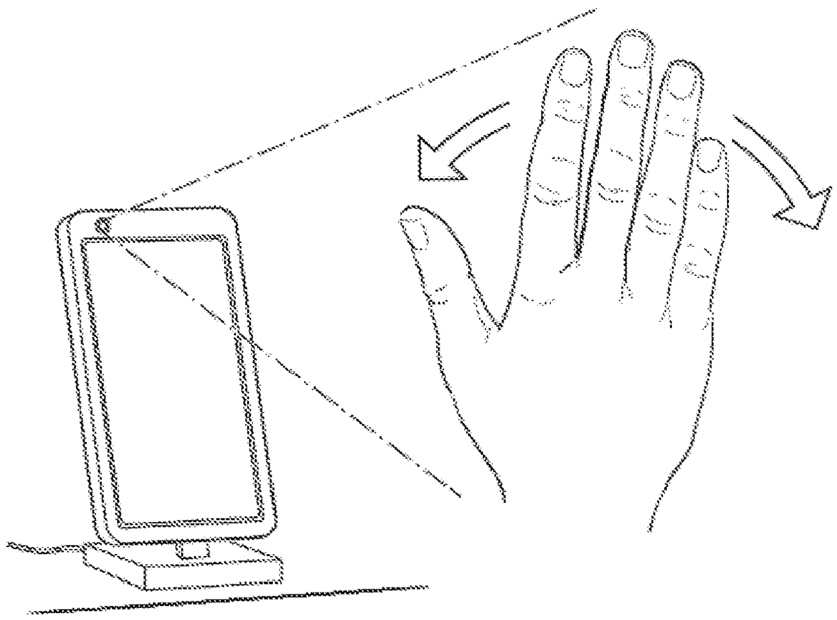
FIGS. 2*a* and 2*b* are examples of a Real Time Input Device in accordance with the present disclosure.
Figure 2B:
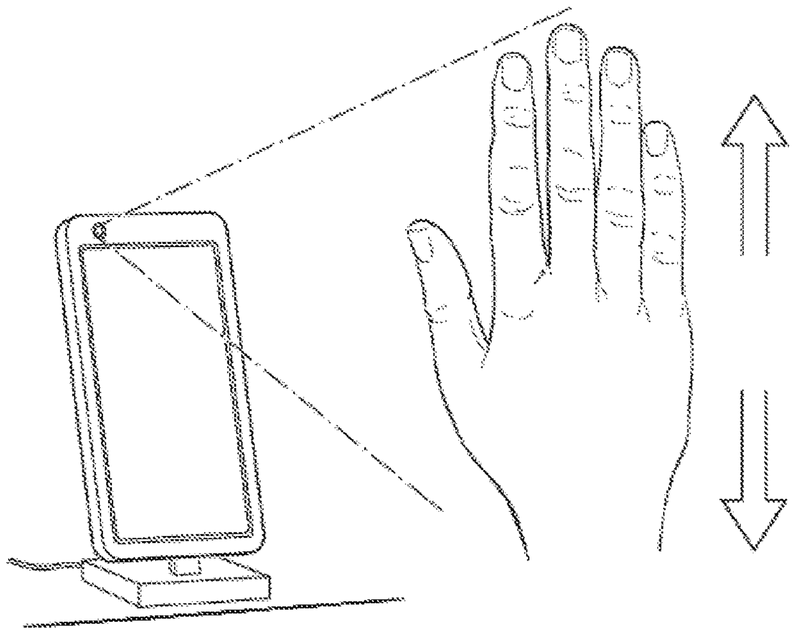

One example of such kind of RID is shown in FIG. 2*a* and FIG. 2*b* in which a mobile device having a camera acts as a RID, the person sitting in front of the camera can move his hands, the mobile device will capture the hand gestures and be interpreted as a control signal in the system. The camera can be any type of camera, such as but not limited to 2D, 3D and depth cameras.

In yet another embodiment the RID 1 could be a piece of dedicated hardware, such as but not limited to, new types of musical instruments, replicas of traditional musical instruments, DJ-equipment, live music mixing equipment or similar devices generating the corresponding X, Y, Z, cursor data used as the control signal 2.

In yet another embodiment the RID 1 is a sub-system receiving input from one or more virtual musicians, such as but not limited to, parameters in a video game, an artificial intelligence (AI) algorithm or entity, a network of remote musicians, a loop handler, a multi-dimensional loop handler, one or more random generators and any combinations thereof. Said multi-dimensional loop handler may be configured to record a cursor movement and repeat it continuously in or out of sync with the musical tempo. Furthermore, said loop handler may be smoothed by means of interpolation, ramping, low-pass filtering, splines, averaging and the like.

In yet another embodiment the control signal 2 is replaced or complemented by control input from a remote network of one or more musicians of a remote musician network 3. The data rate of such a remote-control signal 2 is kept to a minimum in order to avoid excessive latency that would make the remote musician input very difficult. The present disclosure solves this data rate issue inherently since the music is generated in real-time by each separate instance of the system running the same MRS 7 settings in each remote musician location and therefore no audio data needs to be transmitted across the network, which would require data rates many times higher than that of the remote-control signals 2. Furthermore, said input from remote musicians as well as the note trigger signals 6 need to be synchronized in order for the complete piece of generated music to be coherent. In this embodiment, clocks of the remote systems are all synchronized. This synchronization can be achieved by Network Time Protocol (NTP), Simple Network Time Protocol (SNTP), Precision Time Protocol (PTP) or the like. Synchronization of clocks across a network is considered known to those skilled in the art.

In yet another embodiment, the network of remote musicians and instances of the present disclosed system as described above, is built on 5G or other future communication standards or network technologies focused on low latency rather than high bandwidth.

In yet another embodiment the RID could be connected to a musically trained AI (Artificial Intelligence Assistant Composer, or AIAC for short). Such AI acting as a musician may be based on a certain deep learning and/or artificial neural network implementation such as, but not limited to, Deep Feed Forward, Recurrent Neural Network, Deep Convolutional Network, Liquid State Machine and the likes. Said AI may also be based on other structures such as, but not limited to, Finite State Machines, Markov Chains, Boltzmann Machines and the likes. The fundamental knowledge that these autonomous processes are based upon may be a mixture of conventional musical rules, such as the studies of counter-point, Schenkerian analysis and similar musical processes, as well as community driven voting per generation or other means of human quality assurance. The knowledge may also be sourced through deep analysis of existing music in massive scale using online music libraries and streaming services through means such as but not limited to, FFT/STFT analysis of content using neural networks and Haar cascades, pitch detection in both spectral/temporal and frequency domains, piggybacking on existing API's per service or using Content ID systems otherwise designed for copyright identification, etc. Furthermore, said AI can be trained using existing music libraries by means of audio analysis, polyphonic audio analysis, metadata tags containing information about certain musical rules such as, but not limited to, scales, key, meter, character, instruments, genre, style, range, tessitura, and the likes.

For all the above embodiments, any number of additional cursor values above the three (X, Y, Z) used in the examples can also be embedded in the control signal 2. One example of use of additional cursor values is to manipulate other musical rules within the MRS 7. Such additional musical rules could be, but is not limited to, legato, randomness, effects, transposition, pitch, rhythm probabilities and the like. Additional cursor values in the control signal 2 can also be used to control other system blocks directly. One example of such direct control of other system blocks could be, but is not limited to, control of the audio generator 11 for adding direct vibrato, bypassing the musical time scale synchronization performed by the MRS 7.

In one embodiment, the audio generator (AG) 11 may be configured to generate an audio signal 10 corresponding to the output signal 8 of the TCPG 9 by means of selection from a pre-recorded set of samples (i.e. a sampler), generation of the corresponding sound in real-time (i.e. a synthesizer) or combinations thereof. The functionality of a sampler or a synthesizer is considered known by someone skilled in the art.

The AG 11 may be configured to take additional real-time control signals 2 such as vibrato, pitch bend and the likes that has not been synchronized with the musical tempo within the MRS or TCPG. The AG 11 may be internal or external to the music generating system and may even be connected in a remote location or at a later time to a recorded version of the output signal 8.

The optional post processing block (PPB) 13 can be configured to add effects to the outgoing audio signal and/or mix several audio signal streams in order to complete the final music output. Such effects could be, but is not limited to reverb, chorus, delay, echo, equalizer, compressor, limiter, harmonics generation, and the likes. It's expected that someone skilled in the art will know how such effects and audio mixing capabilities can be implemented. The PPB 13 may be configured to take additional real-time control signals 2 that has not been synchronized with the musical tempo within the MRS or TCPG such as, but not limited to, a low frequency oscillator (LFO), a virtual room parameter and other changing signals affecting the final audio mix. Such virtual room parameter may be configured to alter a room impulse response acting as a filter on the final audio mix by means of FIR filter convolution, reverb, delay, phase shift, IR filter convolution or combinations thereof.

The composer input 4 may be an exported file format from a digital audio workstation DAW or music composition software which is translated into musical rule definitions RD 701 compatible with the structure of the musical rule set MRS 7.

FIG. 2 shows an example of a Real Time Input Device 1. The Real Time Input Device 1 can be, but not limited to, a mobile device, a computer etc. with a camera. The camera can be, but is not limited to, a 2D, 3D or depth camera. The camera may be configured to capture the gestures of the user sitting in front of the camera and interpret the gestures into a control signal of the real time music generation by means of computer vision techniques.

Figure 3:
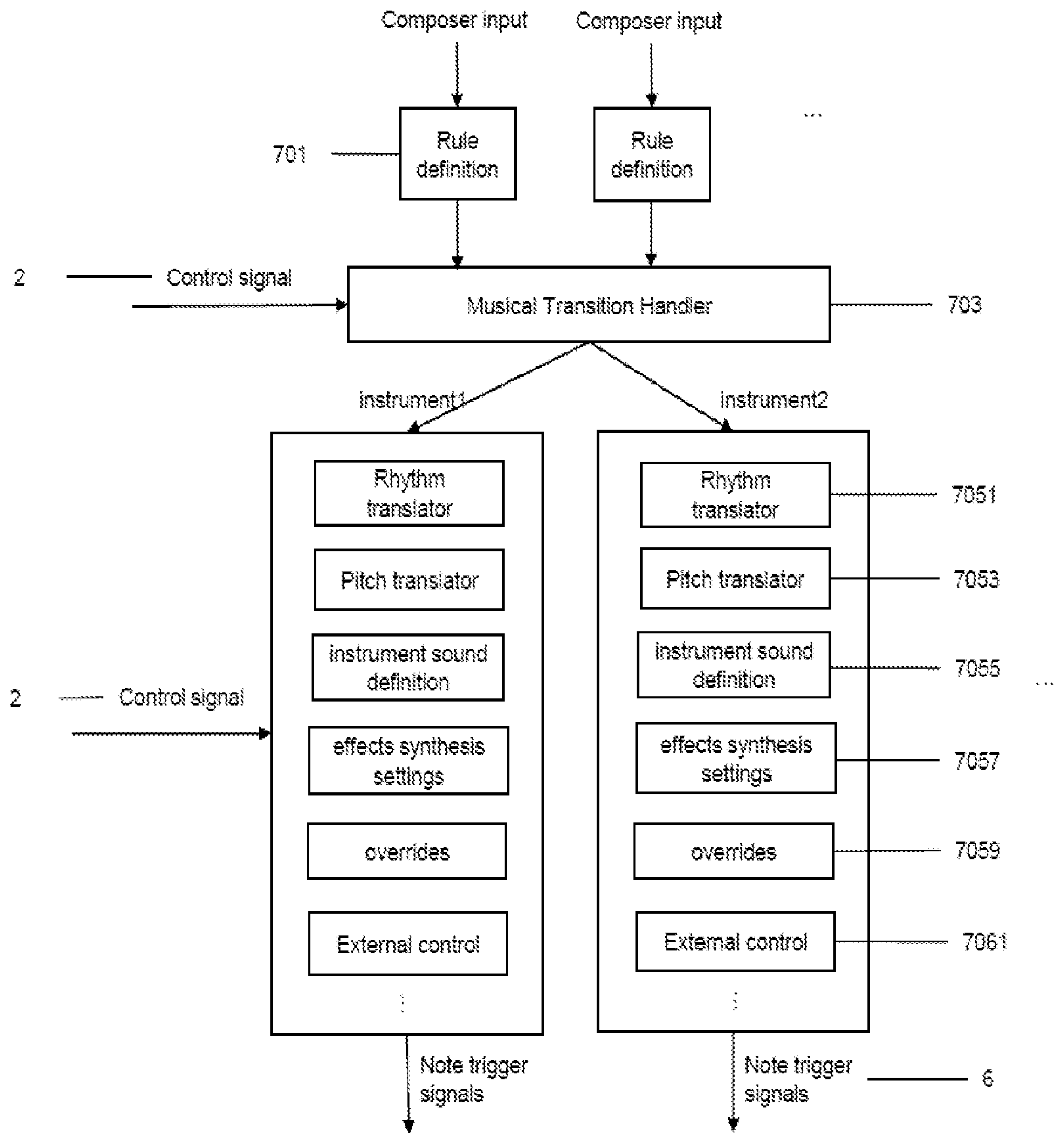
FIG. 3 is a schematic of a Musical Rule Set unit in accordance with the present disclosure.

FIG. 3 shows an example schematic of a musical rule set (MRS) 7. The MRS 7 can be configured to contain musical rule definitions 701 pre-defined by a composer input. The composer input may be an exported file format from a digital audio workstation (DAW) or music composition software which is translated into musical rule definitions (RD) compatible with the structure of the musical rule set (MRS). Furthermore, said composer input may originate from an artificial intelligence (AI) composer, randomizations or mutations of other existing musical elements and the like.

The MRS may use the rule definitions with any or all additions made through either real-time user input, previous user input, real time AI processing through musical neurons, offline AI processing from knowledge sourced by static and fluid data, or through various stages of loopback from performance parameters or any public variables originating from an interactive system. A loopback to the AI may be used for both iterative training purposes and as directions for the real time music generation. The musical neurons generate signals based on the output of Musical DNA which uses musical characteristics from the MRS unit. The MRS Unit may have core blocks 301, pitch blocks 303, beat blocks 305 and file blocks 307 to define the musical characteristics.

Each such musical rule definition 701 may contain the rule set for part of or an entire piece of music such as, but not limited to, instrumentation, key, scale, tempo, time signature, phrases, grooves, rhythmic patterns, motifs, harmonies, and the like.

Musical rule definitions 701 may also contain miscellaneous information not directly tied to musical traits such as, but not limited to, a block-chain implementation, changelog, cover art, composer info and the like. Said block-chain implementation may be configured to handle copyrights of musical rule definitions 701. In one embodiment said blockchain implementation may enable crowd sourced musical content in the form of musical rule sets, conventional musical phrases, lyrics, additional control data sets for alternative outputs and the like.

The MRS unit 7 generates note trigger signals 6 based on the selected rule definitions and the control signal from RID 1. In one example, the note trigger signals 6 can be a pitch select signal and a trigger signal. The pitch select signal will be used by the TCPG later to synchronize the generated signal in frequency domain and the trigger signal will be used by the TCPG to synchronize the generated signal in time domain.

Said instrumentation of a musical rule definition 701 may be mapped to multiple separate virtual instruments each containing unique per instrument rules such as, but not limited to, a rhythm translator 7051, a pitch translator 7053, an instrument sound definition 7055, an effect synthesis setting 7057, an override 7059, an external control 7061 etc.

The rhythm translator 7051 may be configured to translate a musical description of rhythm such as, but not limited to, generation or restrictions of rhythmic notes and pauses derived from tempo divisions, probabilities, pre-defined patterns, a MIDI-file, algorithms such as fractals, Markov chains, granular techniques, Euclidian rhythms, windowing, transient detection, or combinations thereof, as defined in the musical rule definition 701 and optionally manipulated by a control input 2. The resulting rhythmic pattern may be further processed by random or pre-defined variations of different aspects such as, but not limited to, fluid phase offset, quantized phase offset, pulse length, low frequency oscillators, velocity, volume, decay, envelopes, attacks and the like. The resulting set of trigger signals may be used to control a TCPG 9.

The pitch translator 7053 may be configured to translate a musical description of frequencies, such as, but not limited to, scales, chords, MIDI-files, algorithms such as fractals, spectral analysis, Markov chains, granular techniques, windowing, transient detection, or combinations thereof, as defined in the musical rule definition 701 and optionally manipulated by a control input 2. The resulting choice of frequencies may be further processed by random or predefined variations of different aspects such as, but not limited to, fluid pitch offset, quantized pitch offset, vibrato, low frequency oscillators, sweeps, volume, decay, envelopes, attacks, harmonics, timbre and the like. The resulting set of frequency signals may be used to control a TCPG 9.

In another embodiment the TCPG may be bypassed by directly using a signal describing both time and frequency parameters such as, but not limited to, a MIDI-signal connecting the MRS directly to the Audio Generator In one embodiment, the rhythm translator 7051 and pitch translator 7053 may be linked or replaced by a single unit defining both the rhythm and pitch based on a single playable matrix. Examples of such matrix may be but is not limited to a playable MIDI-file, algorithms such as fractals, Markov chains, granular techniques, windowing and combinations thereof. Such playable MIDI-file may be mapped to the control signal 2 such that certain cursors are mapped to corresponding dimensions in said playable matrix. One example of said mapping may be to use the X-axis cursor to describe current note length in a playable MIDI-file or matrix and Y-axis cursor to control the selection of note in said MIDI-file or matrix where a higher value on the Y-axis cursor plays a later note within said MIDI-file or matrix. Another example of said mapping may be to use the cursors to vary the MIDI-file or matrix by adding or subtracting pitch and rhythm material by means of fractals, Markov chains, granular techniques, Euclidian rhythms, windowing, transient detection, or combinations thereof depending on said cursor values wherein the X-axis cursor may add or subtract rhythmic material based on its offset from the middle value and the Y-axis cursor may add or subtract tonal material based on its offset from the middle value. Yet another example of said mapping may be to use the X-axis cursor to slow down or speed up the music (either by percentage or by discreet steps) and let the Y-axis cursor transpose the pitch material (either in absolute steps or within a pre-defined scale).

The instrument sound definition 7055 may be configured to define the sound characteristics of a virtual instrument by means of setting parameters to be used by a synthesizer, selecting a sample library to be used by a sampler, setting an instrument and the likes.

The effects synthesis settings 7057 may be configured to specify certain effects settings to be applied on each instrument. Such effects settings may be, but is not limited to, reverb, chorus, panning, EQ, delay and combinations thereof.

The override block 7059 may be configured to override certain global parameters such as a global scale, key, tempo or the likes as defined by the overall rule definition currently being played. This way, a certain instrument can play something independently of said global rules for a certain piece of music.

The external control block 7061 may be configured to output a control signal for external devices such as external synthesizers, samplers, sound effects, light fixtures, pyro technical effects, mechanical actuators, game parameters, video controllers and the likes. Said output signal may follow standards such as, but not limited to, MIDI, OSC, DMX-512, SPDIF, AES/EBU, UART, I2C, ISP, HEX, MQTT, TCP, I2S and the likes.

In aspects, each virtual instrument may be linked to one or more other virtual instruments regarding any parameter therein.

An optional musical transition handler 703 may be configured to have the top-level control of the musical form, by gradually morphing between multiple musical rule definitions 701 and/or adding new musical content that ties together the musical piece as a whole. The musical transition handler may be configured to make a transition for one or more instruments by musically coherent means (that are perceived as musical to a human listener with knowledge of the current genre or style). Such transitions may be needed between different settings in a video game, between the verse and chorus of a song, between different moods in a story line of a game, movie, theatre, virtual reality experience or the like. The musical transition handler 703, may use one or more musical techniques for each instrument transitioning between musical rule definitions 701 according to the composer input, a control signal 2, an internal sequencer or the like. Such musical transition techniques may be, but are not limited to, crossfading, linear morphing, logarithmic morphing, sinusoidal morphing, exponential morphing, windowed morphing, pre-defined musical phrases, retrograde, inversion, other canonic utilities, fractal composition, Markov chains, Euclidian rhythms, granular techniques, intermediate musical rule definitions 701 created specifically for morphing purposes, and combinations thereof.

Figure 4:
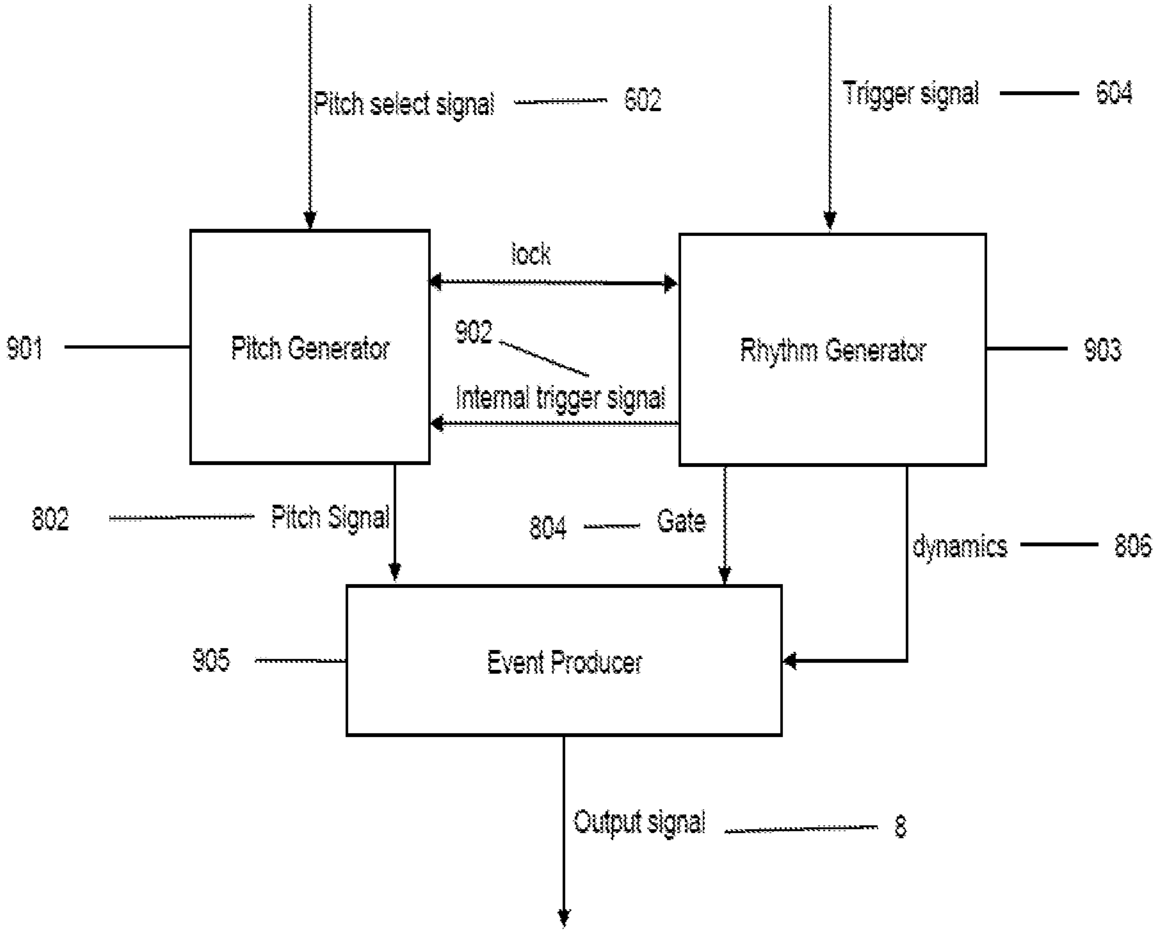
FIG. 4 is a schematic of a Timing Constrained Pitch Generator in accordance with the present disclosure.

FIG. 4 shows an example schematic of a time-constrained pitch generator (TCPG) 9. In one embodiment illustrated in this figure, the temporal and tonal synchronization set by the MRS unit is obtained by a structure wherein the rhythm generator 903 controls the pitch generator 901 through an internal trigger signal 902. As a result of said structure, any new notes can only be created by the pitch generator on certain pre-defined moments in time, according to the rule set defined in the MRS 7. The rhythm generator 903 can, but is not limited to, generate the internal trigger signal 902 by forwarding pulses directly from the input trigger signal 604 from the MRS 7, division of a clock signal or by generating a rhythm based on sequencer rules set by the MRS 7. The functionality of a sequencer, such as those used in drum machines and the likes, is considered known to those skilled in the art.

The pitch generator 901 can be configured to respond to the pitch select signal 602 from the MRS 7 in order to pick the right tonal pitch and transmits such note whenever triggered by the internal trigger signal 902. The pitch select signal 602 can contain one or several notes and thereby the pitch generator 901 can generate single pitches or chords transmitted in a pitch signal accordingly.

Furthermore, the pitch generator 901 can be locked to the rhythm generator 903 by a lock signal resulting in synchronous playback of the selected pitch with pre-defined note durations. For example, this could be used to play a pre-defined melody where notes and pauses need to have a certain duration and pitch in order for said melody to be performed as intended.

The event producer 905 can be configured to generate an output signal 8 based on an incoming pitch signal 802, a gate signal 804 and a dynamic signal 806. Said output signal 8 can but is not limited to follow standards such as MIDI, General MIDI, MIDICENT, General Midi Level 2, Scalable Polyphony MIDI, Roland GS, Yamaha XG and the like.

In one embodiment the inputs to the event producer 905 are mapped to the "Channel Voice" messages of the MIDI standard, where the pitch signal 802 controls the timing of the "note-on" and "note-off" messages transmitted by the event producer 905. In such example embodiment, the tonal pitch can be mapped to the "MIDI Note Number" value and the dynamics signal 906 to the "Velocity" value of said "note-on" messages. The gate input 804 can be used to transmit additional "note-off" messages in such example embodiment.

In another embodiment, the event producer 905 may be configured to output music in textual form such as, but not limited to, notes, musical scores, tabs and the like The Audio Generator 11 may be configured to take an output signal and generate the corresponding audio signal by means of playing back the corresponding samples from a sample library, generating the corresponding audio signal by real-time synthesis (i.e. by using a synthesizer) or the like. The resulting audio signal may be output in formats such as, but not limited to, Raw samples, WAV, Core Audio, JACK, PulseAudio, GStreamer, MPEG audio, AC3, DTS, FLAC, AAC, OggVorbis, SPDIF, I2S, AES/EBU, Dante, Ravenna, and the likes.

The Post process device 13 may be configured to mix multiple audio streams such as but not limited to external audio sources 5, vocal audio, game audio, acoustic instrument audio, pre-recorded audio and the likes. Furthermore, the PPD 13 may add effects to each incoming audio stream being mixed as well as the outgoing final audio stream as a means of real-time mastering in order to obtain a production quality audio stream in real-time.

Figure 5:
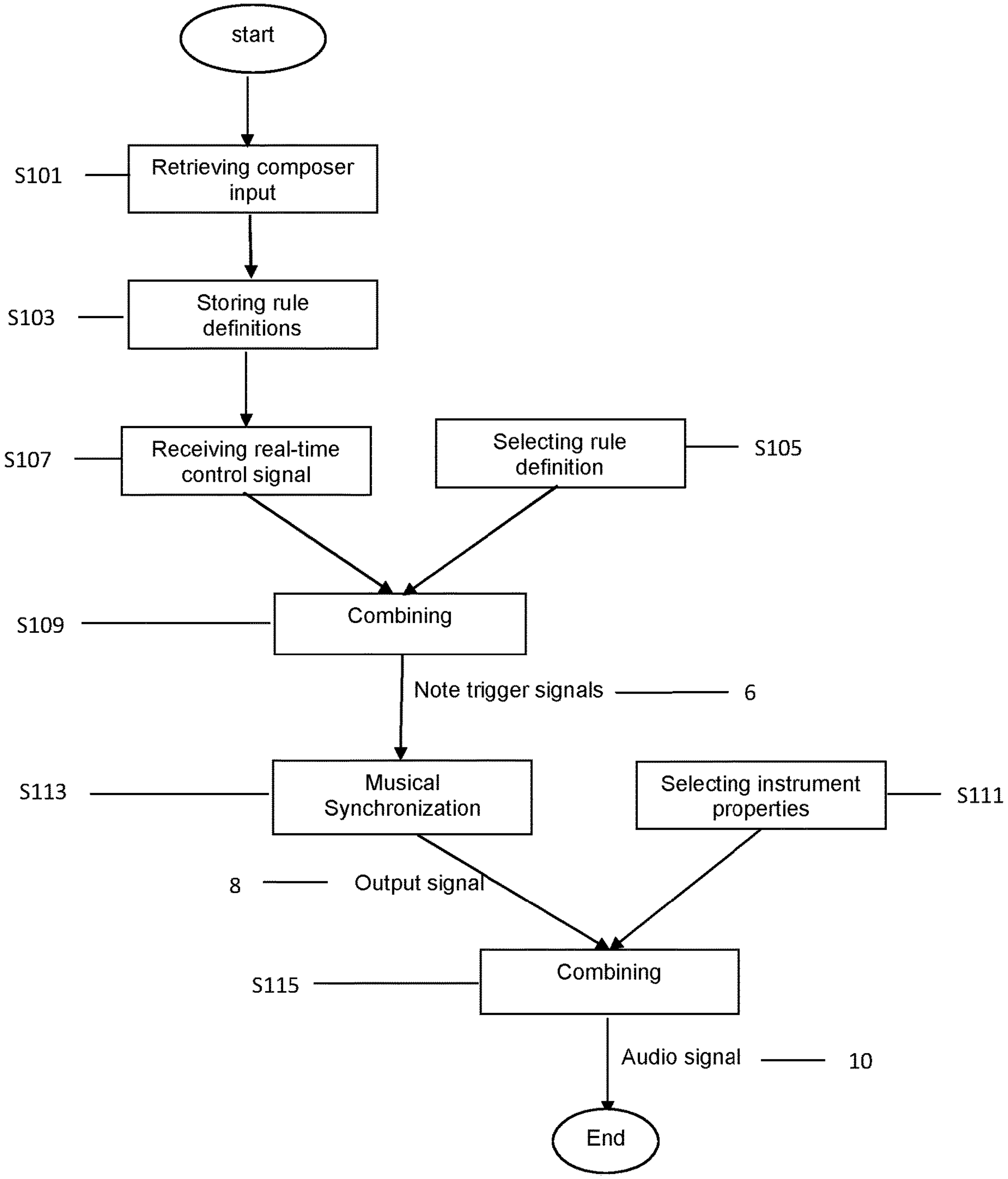
FIG. 5 is an example of a method for real-time music generation.

FIG. 5 shows an example of the method for real-time music generation. At the beginning of the method, the MRS unit 7 retrieves a composer input at S101, a set of adaptable rule definitions 701 will be obtained based on the composer input and stored in a memory of the MRS unit 7 at S103. Then the MRS selects a set of rule definitions from the memory at S105. At S107, the MRS receives a real-time control signal 2 from the RID 1 and combines the control signal 2 and the selected rule definitions at S109. The output note trigger signals 6, which can be, but not limited to a pitch select signal 602 and a trigger signal 604, are outputted to the TCPG 9. The TCPG 9 will synchronize the music in time and frequency domains at S113 and the output signal of the TCPG 9 will be an input of the AG 11. The MRS selects instrument properties at S111 and output them to the AG 11. The AG 11 combines the output signal of the TCPG 9 and the selected instrument properties to obtain an audio signal at S115. The audio signal can be forwarded to a post process device 13 for further processing to adapt the music to the environment or outputted directly.

It will be appreciated that additional advantages and modifications will readily occur to those skilled in the art. Therefore, the disclosures presented herein, and broader aspects thereof are not limited to the specific details and representative embodiments shown and described herein. Accordingly, many modifications, equivalents, and improvements may be included without departing from the spirit or scope of the general inventive concept as defined by the appended claims and their equivalents.

The invention claimed is:

1. A virtual instrument for real-time music generation comprising:

a Musical Rule Set, MRS, unit, said MRS unit is configured to store a set of adaptable rule definitions corresponding to a composer input, select a set of instrument properties and a set of rule definitions from the set of adaptable rule definitions and combine the selected set of rule definitions with a real-time control signal into note trigger signals associated with time and frequency domain properties;

a Timing Constrained Pitch Generator, TCPG, configured to generate an output signal representing music, said TCPG synchronizes generated tones in time and frequency, domain based on the note trigger signals; and an audio generator configured to convert the output signal from the TCPG and combine the output signal with the selected set of instrument properties into an audio signal, wherein the set of adaptable rule definitions describe real-time morphable music parameters and said morphable music parameters are controllable directly by the real-time control signal, and a musical transition handler configured to interpret the real-time control signal and handle transitions between different sections in the generated music based on musical characteristics according to the composer input.

2. The instrument in accordance with claim 1, wherein the real-time control signal is received from a real-time input device, RID, which is configured to receive input from a touch screen and translate said input into the real-time control signal.

3. The instrument in accordance with claim 2, wherein the touch screen is configured to provide additional information regarding pressure related to the touch force being received by the touch screen at the touched position and use such additional information together with X and Y coordinates for each point and translate this input signal into the real-time control signal.

4. The instrument in accordance with claim 1, wherein the real-time control signal is received from a real-time input device, RID, which is configured to receive input from at least one of a spatial camera, a video game parameter and a digital camera and translate said input into the real-time control signal.

5. The instrument in accordance with claim 1, wherein the real-time control signal is received from a remote musician network.

6. A method for generating real-time music in a virtual instrument comprising a Musical Rule Set, MRS, unit, a Timing Constrained Pitch Generator, TCPG and an audio generator, said method comprising:

retrieving a composer input in the MRS unit;

storing a set of adaptable rule definitions associated with the composer input in a memory of the MRS unit;

receiving a real-time control signal in the MRS unit;

selecting a set of rule definitions from the set of adaptable rule definitions;

selecting a set of instrument properties;

combining the selected set of adaptable rule definitions with the real-time control signal into note trigger signals associated with time and frequency domain properties;

synchronizing, in the TCPG, new generated tones in time and frequency domains based on the note trigger signals; and combining the output signal with the selected set of instrument properties into an audio signal in the audio generator, wherein the plurality of adaptable set of rule definitions describes real-time morphable music parameters and said morphable music parameters are controllable directly by the real-time control signal, and interpreting the real-time control signal and handling transitions between different sections in the generated music based on musical characteristics according to the predefined composer input.

7. The method in accordance with claim 6, wherein the real-time control signal is received from a real-time input device, RID, which is configured to receive input from a touch screen and translate said input into the real-time control signal.

8. The method in accordance with claim 7, wherein the touch screen is configured to provide additional information regarding pressure related to the touch force being received by the touch screen at the touched position and use such additional information together with X and Y coordinates for each point and translate this input signal into the real-time control signal.

9. The method in accordance with claim 6, wherein the real-time control signal is received from a real-time input device, RID, which is configured to receive input from at least one of a spatial camera, a video game parameter and a digital camera and translate said input into the real-time control signal.

10. The method in accordance with claim 6, wherein the real-time control signal is received from a remote musician network.

11. A computer program product embodied on a non-transitory computer readable medium and comprising computer-readable instructions which, when executed on a computer, causes the method according to claim 6 to be performed.

12. A computer program product embodied on a non-transitory computer readable medium and comprising computer-readable instructions which, when executed on a computer, causes the method according to claim 7 to be performed.

13. A computer program product embodied on a non-transitory computer readable medium and comprising computer-readable instructions which, when executed on a computer, causes the method according to claim 8 to be performed.

14. A computer program product embodied on a non-transitory computer readable medium and comprising computer-readable instructions which, when executed on a computer, causes the method according to claim 9 to be performed.

15. A computer program product embodied on a non-transitory computer readable medium and comprising computer-readable instructions which, when executed on a computer, causes the method according to claim 10 to be performed.

* * * * *